US010838377B1

(12) United States Patent
Xie et al.

(10) Patent No.: US 10,838,377 B1
(45) Date of Patent: Nov. 17, 2020

(54) COMPREHENSIVE CAUSAL IMPACT ESTIMATION SYSTEM WITH A SELECTIVE SYNTHETIC CONTROL

(71) Applicant: HRL Laboratories, LLC, Malibu, CA (US)

(72) Inventors: Daniel K. Xie, Sugar Land, TX (US); Jiejun Xu, Chino, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 142 days.

(21) Appl. No.: 15/873,859

(22) Filed: Jan. 17, 2018

Related U.S. Application Data

(60) Provisional application No. 62/472,886, filed on Mar. 17, 2017.

(51) Int. Cl.
*G05B 13/04* (2006.01)
(52) U.S. Cl.
CPC .................................. *G05B 13/042* (2013.01)
(58) Field of Classification Search
None
See application file for complete search history.

(56) References Cited

U.S. PATENT DOCUMENTS

| 8,108,245 | B1* | 1/2012 | Hosea | G06Q 30/02 |
| | | | | 705/14.49 |
| 10,037,545 | B1* | 7/2018 | Huang | G06Q 30/0246 |
| 2017/0193529 | A1* | 7/2017 | Sheppard | G06Q 30/0245 |
| 2017/0323327 | A1* | 11/2017 | Pachisia | G06Q 30/0244 |
| 2017/0331910 | A1* | 11/2017 | Lada | H04L 67/22 |
| 2018/0197090 | A1* | 7/2018 | Yates | G06N 3/04 |
| 2019/0087469 | A1* | 3/2019 | Zhang | G06Q 30/0201 |

OTHER PUBLICATIONS

Abadie, A. Diamond, and J. Hainmueller. Synth: An R package for synthetic control methods in comparative case studies. Journal of Statistical Software, 42(13), 2011, pp. 1-17.
A. Abadie, A. Diamond, and J. Hainmueller. Comparative politics and the synthetic control method. American Journal of Political Science, 59(2): pp. 495-510, 2015.
A. Abadie and J. Gardeazabal. The economic costs of conflict: A case study of the Basque Country. The American Economic Review, 93(1): pp. 113-132, 2003.

(Continued)

*Primary Examiner* — Thomas C Lee
*Assistant Examiner* — Gary Collins
(74) *Attorney, Agent, or Firm* — Tope-McKay & Associates (57) ABSTRACT

Described is a system for estimating long-term causal effects of interventions on various entities. A synthetic control is generated from selected donor series such that parameters involved in the generation of the synthetic control can be tuned automatically, or manually by a user. Post-intervention synthetic control values are generated from the synthetic control, and estimates of long-term causal effects of an intervention onto aggregate units similar to the donor series are determined. A device is controlled based on the determined estimates.

21 Claims, 10 Drawing Sheets

(56) References Cited

OTHER PUBLICATIONS

A. Billmeier and T. Nannicini. Trade openness and growth: Pursuing empirical glasnost. IMF Economic Review, 56(3): pp. 447-475, 2009.

K. H. Brodersen, F. Gallusser, J. Koehler, N. Remy, S. L. Scott, et al. Inferring causal impact using bayesian structural time-series models. The Annals of Applied Statistics, 9(1): pp. 247-274, 2015.

A. Fremeth, G. L. Holburn, and B. K Richter. Making causal inferences in small samples using synthetic control methodology: Did Chrysler benefit from government assistance? Available at SSRN 2135294, 2013, pp. 1-47.

* cited by examiner

COMPREHENSIVE CAUSAL IMPACT ESTIMATION SYSTEM WITH A SELECTIVE SYNTHETIC CONTROL

CROSS-REFERENCE TO RELATED APPLICATIONS

This is a Non-Provisional patent application of U.S. Provisional Application No. 62/472,886, filed in the United States on Mar. 17, 2017, entitled, "A Comprehensive Causal Impact Estimation System with a Selective Synthetic Control," the entirety of which is hereby incorporated by reference.

BACKGROUND OF INVENTION

(1) Field of Invention

The present invention relates to a system for causal impact estimation and, more particularly, to a system for causal impact estimation with a tunable synthetic control.

(2) Description of Related Art

The original synthetic control method was first demonstrated in 2003, with a detailed application towards studying the impact of terrorist conflict in the Basque country (see Literature Reference No. 3 of the List of Incorporated Literature References). This method constructs a synthetic version of a treated unit by taking a convex combination of other non-treated units, where the combination is chosen to match the synthetic unit to the true treated unit on a set of weighted covariates (see Literature Reference Nos. 1 and 3). While this method has grown in popularity, certain artifices of fitting of this method lead to potential donors contributing nothing to the synthetic unit (see Literature Reference Nos. 2, 4, and 6). Despite these tendencies, the original synthetic control method is also not guaranteed to necessarily induce sparsity either, something that has been confirmed in simulations.

Furthermore, the strict criteria of choosing a convex combination of other units means that if the treated unit is larger in a given measurement than the chosen donors, the treated unit can never be well approximated. A recent stated competitor to the original synthetic control is the Bayesian structural time series approach described in Literature Reference No. 5. Despite the stated goal of constructing a synthetic control, it is noted that this Bayesian method does not actually construct a true synthetic control in that the counterfactual predictions are not generated by a synthetic unit with features resembling those of the true unit.

Previous work on constructing synthetic controls in a traditional manner suffers from artificial sparsity induced by the manner in which the synthetic control is created. Thus, a continuing need exists for a modified synthetic control method that improves on previous methods of construction by allowing more flexibility in the number of donors to the synthetic control.

SUMMARY OF INVENTION

The present invention relates to a system for causal impact estimation and, more particularly, to a system for causal impact estimation with a tunable synthetic control. The system comprises one or more processors and a non-transitory computer-readable medium having executable instructions encoded thereon such that when executed, the one or more processors perform multiple operations. The system generates a synthetic control from a plurality of donor series selected to contribute to the synthetic control, wherein parameters involved in the generation of the synthetic control can be tuned automatically, or manually by a user. Post-intervention synthetic control values are generated from the synthetic control. Estimates of long-term causal effects of an intervention onto aggregate units similar to the plurality of donor series are determined. A device is controlled based on the determined estimates.

In another aspect, a visualization application is generated in which a set of results generated based on the synthetic control can be viewed.

In another aspect, the system sends a message to a user account associated with a particular geographic location.

In another aspect, an automated manufacturing or inventory control process is changed based on the determined estimates.

In another aspect, a stock market order is executed based on the determined estimates.

In another aspect, the estimates are determined based on a difference between the post-intervention synthetic control values and a set of observed values for a post-intervention treated series.

In another aspect, a number of the plurality of donor series selected can be tuned automatically, or manually by a user.

In another aspect, a visualization application interfaces with the synthetic control such that results generated by the synthetic control can be updated via the visualization application in real-time.

In another aspect, the plurality of donor series is obtained at regular intervals from both public and private sources.

In another aspect, the aggregate units comprise at least one of regional populations, target markets, and state level entities.

In another aspect, the set of results are employed to quantify an extent of an impact of an event on sales of a commercial product.

In another aspect, if sales of the commercial product are quantified as decreasing due to the event, then the system pushes advertisements related to the consumer product to one or more social media accounts of users.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for causal impact estimation and, more particularly, to a system for causal impact estimation with a tunable synthetic control. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Abadie, A. Diamond, and J. Hainmueller. Synth: An R package for synthetic control methods in comparative case studies. Journal of Statistical Software, 42(13), 2011.
2. A. Abadie, A. Diamond, and J. Hainmueller. Comparative politics and the synthetic control method. American Journal of Political Science, 59(2):495-510, 2015.
3. A. Abadie and J. Gardeazabal. The economic costs of conflict: A case study of the Basque Country. The American Economic Review, 93(1):113-132, 2003.
4. A. Billmeier and T. Nannicini. Trade openness and growth: Pursuing empirical glasnost. IMF Economic Review, 56(3):447-475, 2009.
5. K. H. Brodersen, F. Gallusser, J. Koehler, N. Remy, S. L. Scott, et al. Inferring causal impact using bayesian structural time-series models. The Annals of Applied Statistics, 9(1):247-274, 2015.
6. A. Fremeth, G. L. Holburn, and B. K. Richter. Making causal inferences in small samples using synthetic control methodology: Did Chrysler benefit from government assistance? Available at SSRN 2135294, 2013.

(2) Principal Aspects

Various embodiments of the invention include three "principal" aspects. The first is a system for causal impact estimation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
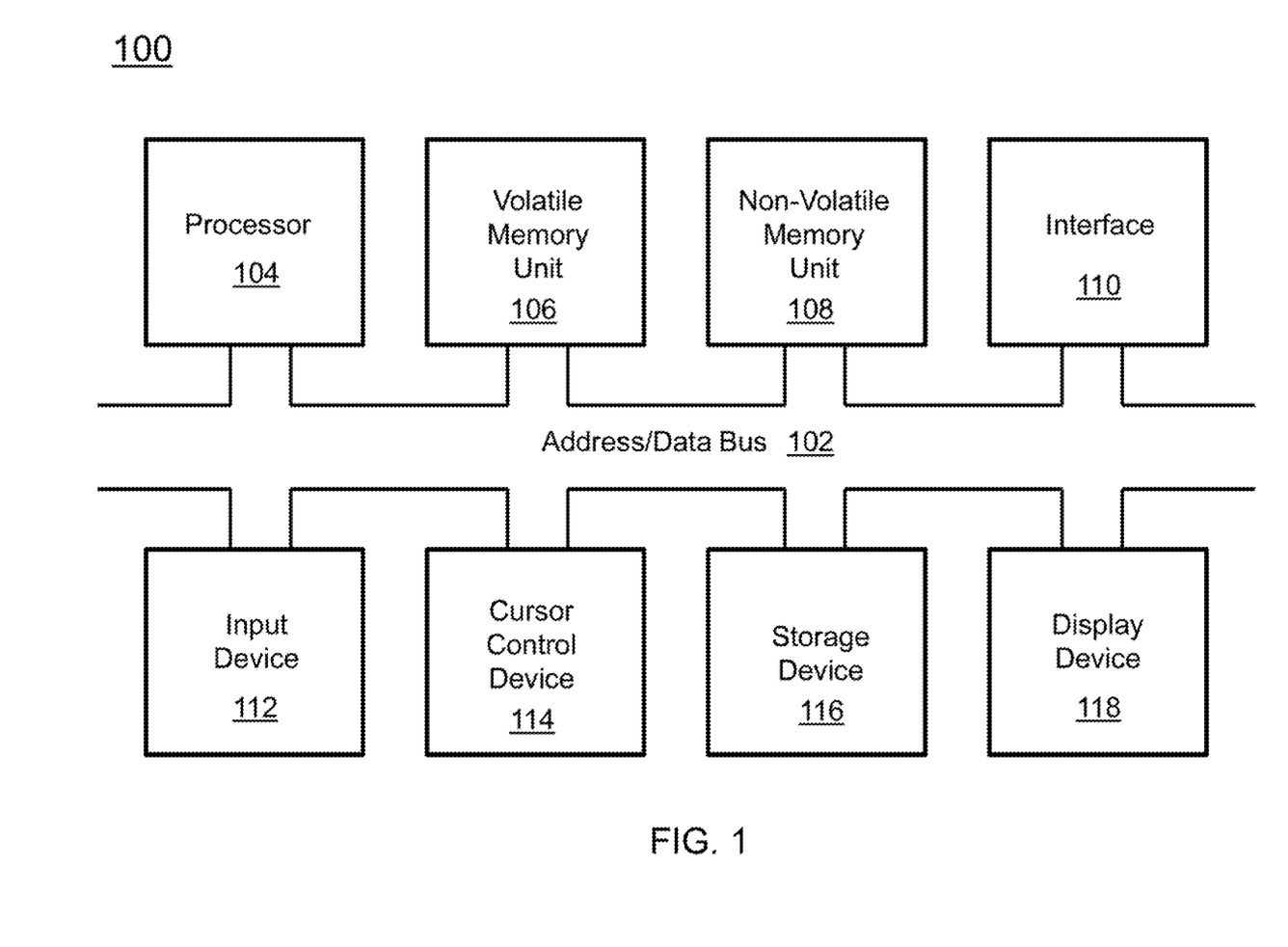
FIG. 1 is a block diagram depicting the components of a system for causal impact estimation according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
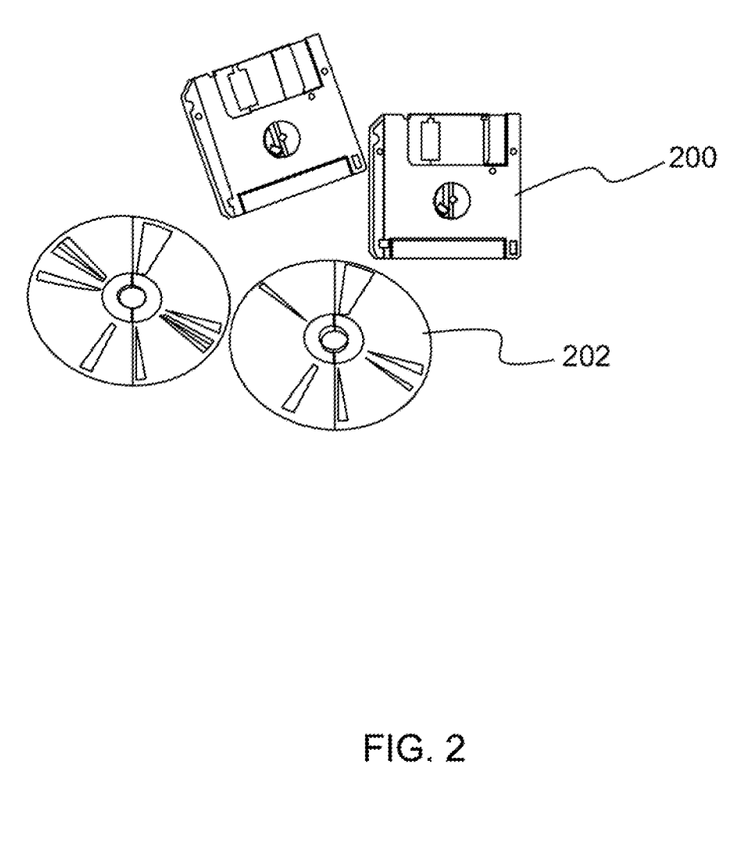
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a system for the estimation of long-term causal effects of interventions onto aggregate units. Such aggregate units may include regional populations, target markets, or state level entities. For instance, the system could be utilized to estimate the long-term impacts of large-scale protests to a country's economics (e.g., imports). Such estimates can be used by policy makers, insurance companies, and vehicle manufacturers to (re)allocate their resources (e.g., supply chains, sales). Given a collection of similar aggregate units not exposed to the intervention, synthetic controls are constructed by collecting multivariate time series data for all units (i.e., entity of measurement). For instance, if one wants to study voter turnout in specific counties of a state, the counties would be the units and the voter turnout would be the relevant measurement.

Intervention, in general, refers to external forces (i.e., an event external to the system) toward the system. A similar term used in the literature that is equivalent is "treatment". These terms come from randomized experiments where people will actively intervene to alter some system. For instance, a natural disaster or a sudden political crisis might be characterized as an intervention on a population. For example, a protest can be an external force/intervention to an original trajectory of a financial system. This trajectory of the synthetic controls is then used to generate counterfactual observations, and the difference of the counterfactual series and the observed series post-intervention are used to estimate the causal effects of the intervention. Time series data is updated at regular intervals (e.g., daily, weekly, monthly, or a finer regular time scale) through a data collection module, allowing a user to immediately project estimates further out in time as soon as the data becomes available.

Within the system according to embodiments of the present disclosure, a unique technique for constructing synthetic controls is incorporated. The technique modifies existing methods by including a dedicated parameter that can be used to the tune the number of units selected to contribute towards the synthetic control, giving one flexibility in the number of series collected. The implementation is referred to as a Selective Synthetic Control. In addition, by relaxing the constraints for donating towards the synthetic control, the methods described herein can be used in more general settings than other systems using common implementation of synthetic controls.

Previous work on constructing synthetic controls in a traditional manner suffers from artificial sparsity induced by the manner in which the synthetic control is created. The system according to embodiments of the present disclosure improves on previous methods of construction by allowing more flexibility in the number of donors to the synthetic control. The number of donors may be tuned manually or automatically with the addition of a special regularization term.

A unique aspect of the invention stems from both the recent availability of high-quality open-source data as well as the establishment of a counterintuitive result. The system leverages publicly available data sources in addition to private data sources captured by the end-user to give continual updates of estimates. Interfaces to these data sources were only recently made available and, thus, not able to be previously harnessed. In addition, the use of the L2 norm with a constrained regression to induce sparsity in the coefficients is a counterintuitive result. Others have not considered this possibility in this specific setting. The L2 penalty is usually used to shrink coefficients in regression problems. By placing the L2 penalty on coefficients, smaller coefficients will be chosen than without the penalty, reducing the variance in least-squares regression. Because in the problem described herein there are additional L1 and non-negativity constraints on the coefficients, the L2 term actually pulls coefficients together with a positive parameter. In particular, it can pull the coefficients away from zero. In contrast, a negative value of the L2 parameter pushes coefficients apart, including potentially pushing some towards zero. This is useful because often when fitting a default synthetic control, a lot of potential donors aren't selected to contribute anything to the synthetic control. They are assigned zero coefficients due to the nature of fitting convex combinations. One can correct for that by eliminating the artificial sparsity with the L2 term.

Described in detail below is a system for the estimation of long-term causal effects of interventions onto aggregate units. Such aggregate units may include regional populations (e.g., countries, provinces, states), target markets (e.g., sports utility vehicle (SUV) buyers, hybrid car buyers), or state level entities (e.g., counties).

Figure 3:
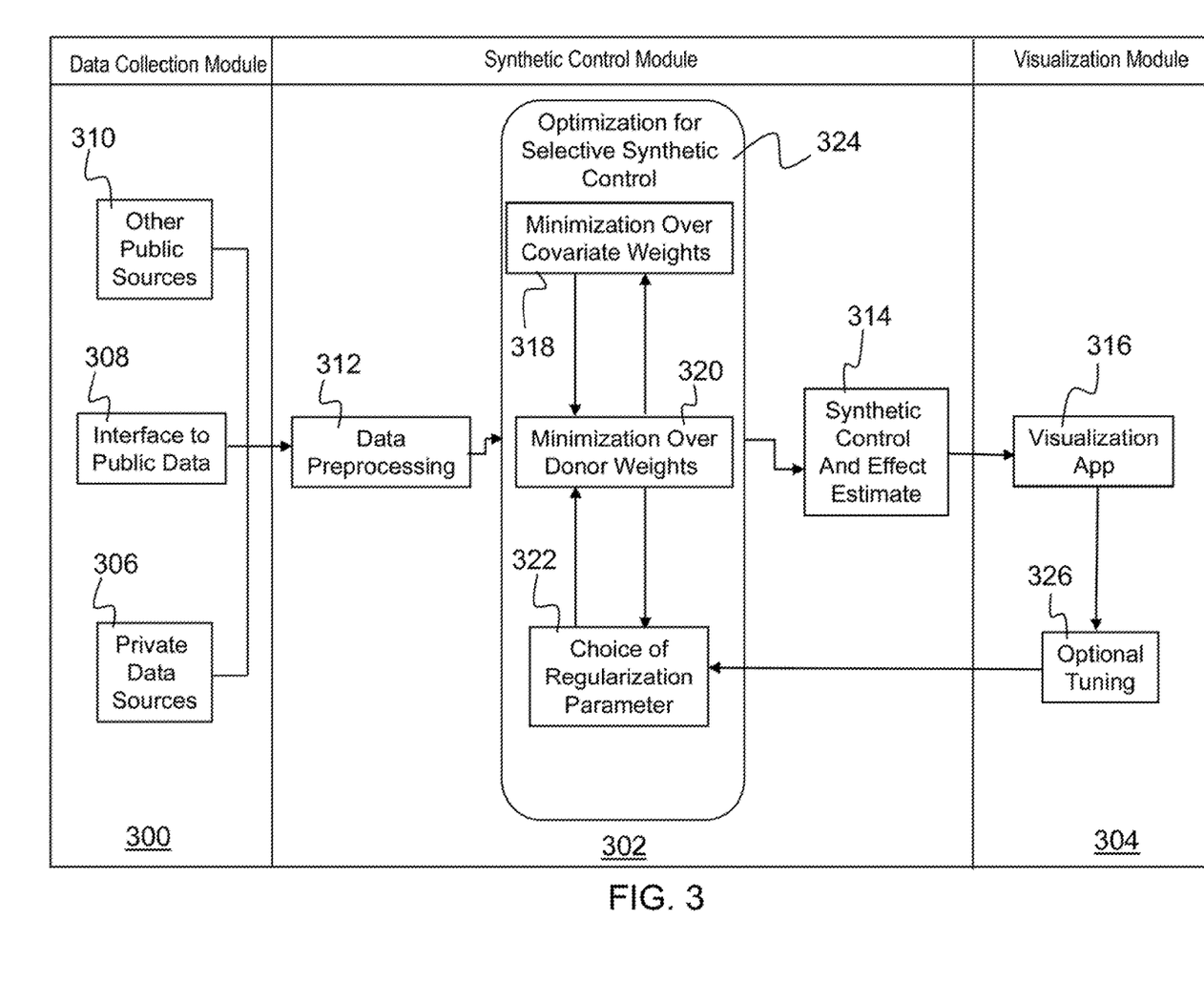
FIG. 3 is a flow diagram illustrating the system for causal impact estimation according to some embodiments of the present disclosure.

FIG. 3 depicts the components of the system described herein and how they function together. The system comprises a data collection module 300, a synthetic control module 302, and a visualization module 304. The data collection module 300 incorporates private data sources 306, an interface to public data 308, and other public data sources 310. A non-limiting example of an "interface to public data" is daily tweets regarding a protest. A non-limiting example of "other public data" is a monthly Brazil import index. A non-limiting example of "private data sources" is a vehicle manufacturer's car sale. Additionally, the system can be linked to directly pull public data from the Federal Reserve and the World Bank, or any from any other suitable location or database.

The data sources (elements 306, 308, and 310) are pre-processed (element 312), and updated impact estimates are provided (synthetic control and effect estimate 314) in the synthetic control module 302 as soon as new data becomes available. A special web application (i.e., visualization app 316) was constructed to help visualize the results of the system in the visualization module 304. Each of these aspects will be described in detail below.

(3.1) Data Collection Module (element 300)

The system according to embodiments of the present disclosure is able to leverage public data (elements 308 and 310) in addition to private data (element 306) provided by the end-user to assist in making causal estimates. For example, in one embodiment, the system automatically interfaces with the Federal Reserve Economic Data (FRED) database, as well as the World Development Indicators database maintained by the World Bank (i.e., interface to pubic data 308). The system is, thus, able to capture a wide level of information about state-level entities, and to automatically pull updated information as it becomes available. This information may be further supplemented by private information the end-user has. Private information refers to enterprise data (e.g., data behind a firewall, non-published corporate information), such as historical sales, projections of sales, orders, and production rates.

(3.2) Construction of Synthetic Control (element 302)

The data is then fed into the next part of the system (i.e., the synthetic control module 302), where a synthetic control is constructed to generate counterfactual estimates. The synthetic control module 302 is a 'virtual' version of an aggregate unit (such as a country, a state, or a population) made by combining other similar units. For example, if one wanted to make a 'virtual' version of Kansas, one would use a combination of the states of Nebraska, Iowa, Illinois, and Colorado. The states used to construct the synthetic Kansas would be potential donors. Essentially, a donor unit is any unit which contributes to the construction of the synthetic control (i.e., has non-zero weight assigned). In the example provided below of Brazilian import data, the other countries form the donor units.

Let $Y_t$ be the pretreatment series for a distinguished variable (e.g., Brazil import) one wishes to make counterfactual observations for, and let $X_t$ be a set of covariates (i.e., a variable that is possibly predictive of the outcome under study) for the same distinguished variable. Let $V_t$ be a multivariate series for potential donor units (e.g., China, Argentina) and $U_t$ measurements of corresponding covariates for those units. Suppose there are n donors, t periods of time, and p covariates. The following procedure is run, which represents minimization over covariate weights 318 and minimization over donor weights 320, as follows:

procedure SELECTIVE SYNTHETIC CONTROL( ) . . .
1. Concatenate the features in $X_t$ into an array of size (pf)×1. Call this X.
2. Concatenate the features in $U_t$ into a corresponding array of size (pf)×n. Call this U.
3. Find β*, P, and λ to minimize the nested optimization problem:

$$\min F(\beta^*(P,\lambda)) \triangleq (Y_t - V_t\beta^*)^T(Y_t - V_t\beta^*),$$

where P is positive semidefinite, and for each value of P and $\lambda\beta^* = \operatorname{argmin}_\beta G_P(\beta) \vartheta (U-X\beta)^T P(U-X\beta) + \lambda\beta^T\beta$
s.t. $\forall i, \beta_i \geq 0$ $$\sum_i \beta_i \geq 1 - \epsilon_1$$

$$\sum_i \beta_i \geq 1 + \epsilon_2$$

end procedure

Here, P is a (typically chosen to be diagonal) positive semi-definite matrix, λ is a regularization parameter (element 322) added into the model, β is a set of donor weights, and $\epsilon_1$ and $\epsilon_2$ are terms to relax the constraints of the standard synthetic control construction. The model incorporates a L2 penalty term on the coefficients of the donor weights, which can be used like a standard L1 penalty to control sparsity as the sum of the donor weights are constrained in size. $\lambda\beta^T\beta$ forms the L2 penalty term. This is due to the L2 term assigning less penalty to convex combinations with more similar coefficients. In this case, a negative λ will, thus, enforce sparsity, whereas a positive one will add stronger weights to weaker signals. The nested optimization is conducted using a genetic algorithm to optimize over the outer function, and a quadratic programming solver or a quasi-Newton algorithm for the inner optimization problem. Publicly available code in the R programming language was used to perform these tasks. "Genetic algorithm" is a general term for an algorithm that optimizes an objective function through stages of mutation and scoring. One implementation used in the system according to embodiments of the present disclosure is a genetic algorithm in the "rgenoud" library for the R programming language.

Once the synthetic control has been created via optimization for selective synthetic control 324, the trajectory of the synthetic control post-intervention is followed to generate counterfactual observation. The individual causal estimates are constructed as the difference of the synthetic control values and the observed values for the treated unit post-intervention (i.e., synthetic control an effect estimate 314). As described above in the Brazil use case scenario, the impact on imports is estimated after a crisis occurs. One can get the estimate by differencing the counterfactual values generated by the synthetic control from the true observed values after the event occurs.

(3.3) Visualization Module (element 304)

To facilitate user adaptation and knowledge sharing, the invention comprises an application (i.e., visualization app 316) in which users can view the results generated by the synthetic control module 302. This application allows the users to view the observed series for the treated unit as well as the counterfactual series generated by the synthetic control. The graphs rendered by the application may be used to quickly inspect the synthetic control for pretreatment fit. Further, the constituent donor series (i.e., the time series from donor units which eventually constituted into the synthetic unit) used to generate the synthetic control may be inspected as well, in addition to the strength of the weights for the donors (element 320). Parameters involved in the construction of the synthetic control (element 322) may be manually altered via optional tuning 326, and the web application (element 316) will interface with the synthetic control module 302 to generate a new synthetic control and update the results in real time (element 314).

Figure 4A:
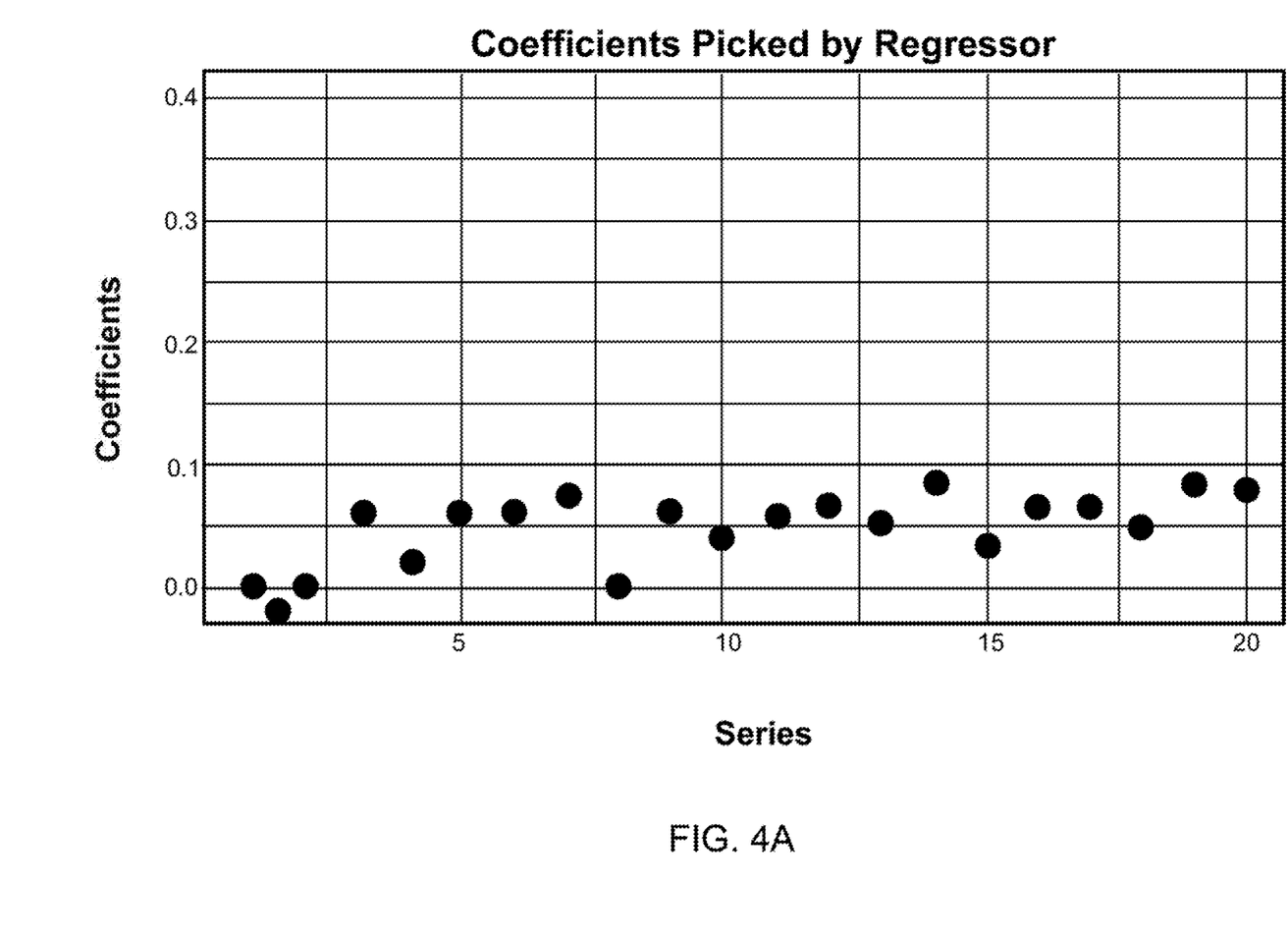
FIG. 4A is a plot illustrating the weighting scheme selected by the selective synthetic control according to some embodiments of the present disclosure.

FIGS. 4A-4D depict demonstration of the visualization module according to embodiments of the present disclosure. The weighting scheme selected by the selective synthetic control is illustrated in FIG. 4A, which shows the contribution of the donor series to the synthetic control. The synthetic control is represented by a series that is constructed by weighting and summing other series. FIG. 4A shows coefficients used to weight those series before adding them together to make the synthetic control series.

Figure 4B:
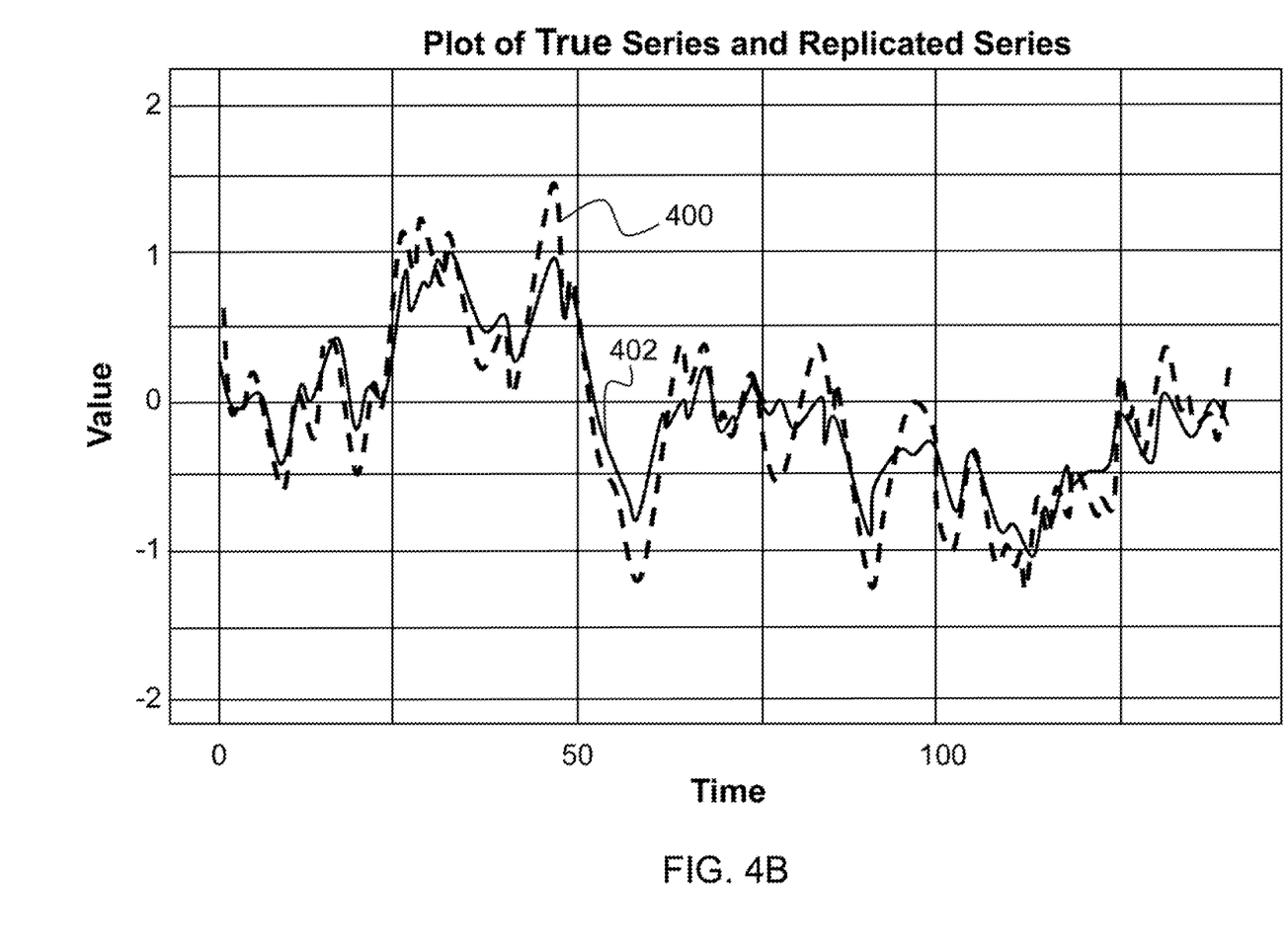
FIG. 4B is a plot illustrating a synthetic series alongside a true series according to some embodiments of the present disclosure.

A plot of the synthetic (replicated) series (represented by dashed curve 400) alongside the true series (represented by solid curve 402) appears in FIG. 4B. Specifically, FIG. 4B shows that the synthetic control is able to duplicate the true series before the critical event happens. If the series did not match up well, the synthetic control would not be useful simply due to lack of a good fit.

Figure 4C:
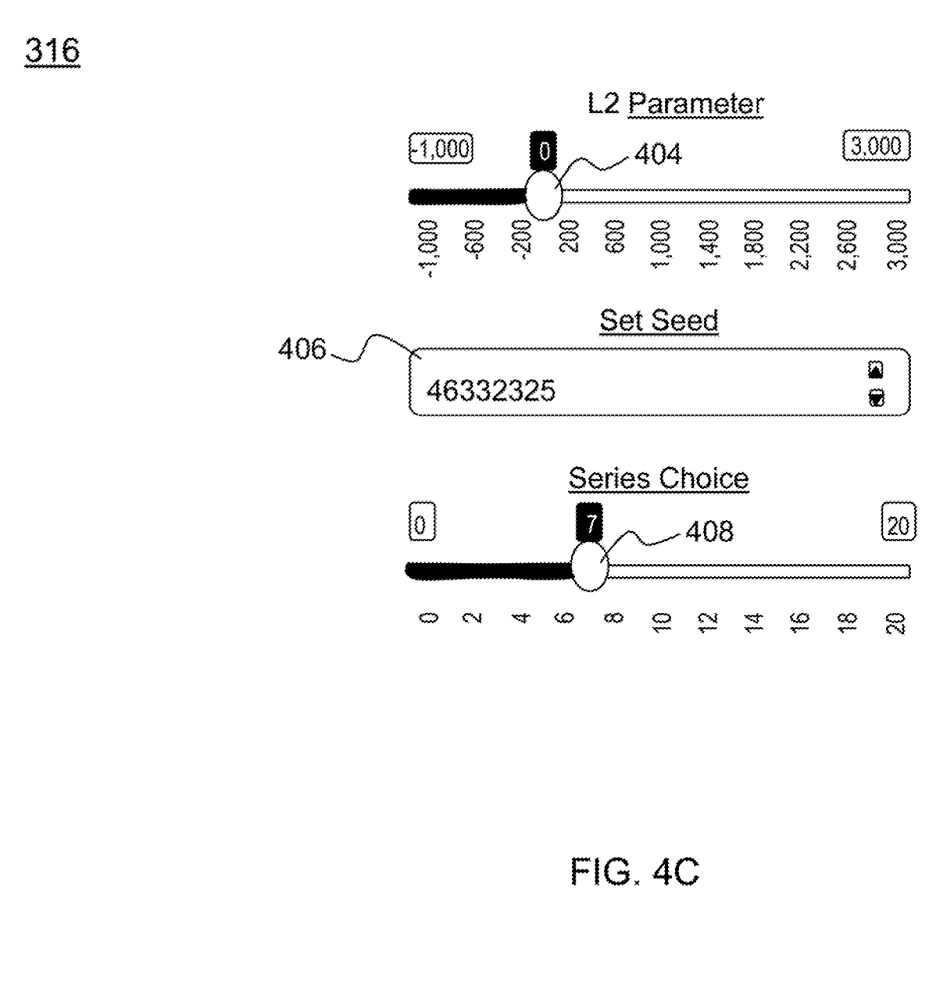
FIG. 4C is an illustration of a visualization application that interfaces with a synthetic control according to some embodiments of the present disclosure.
Figure 4D:
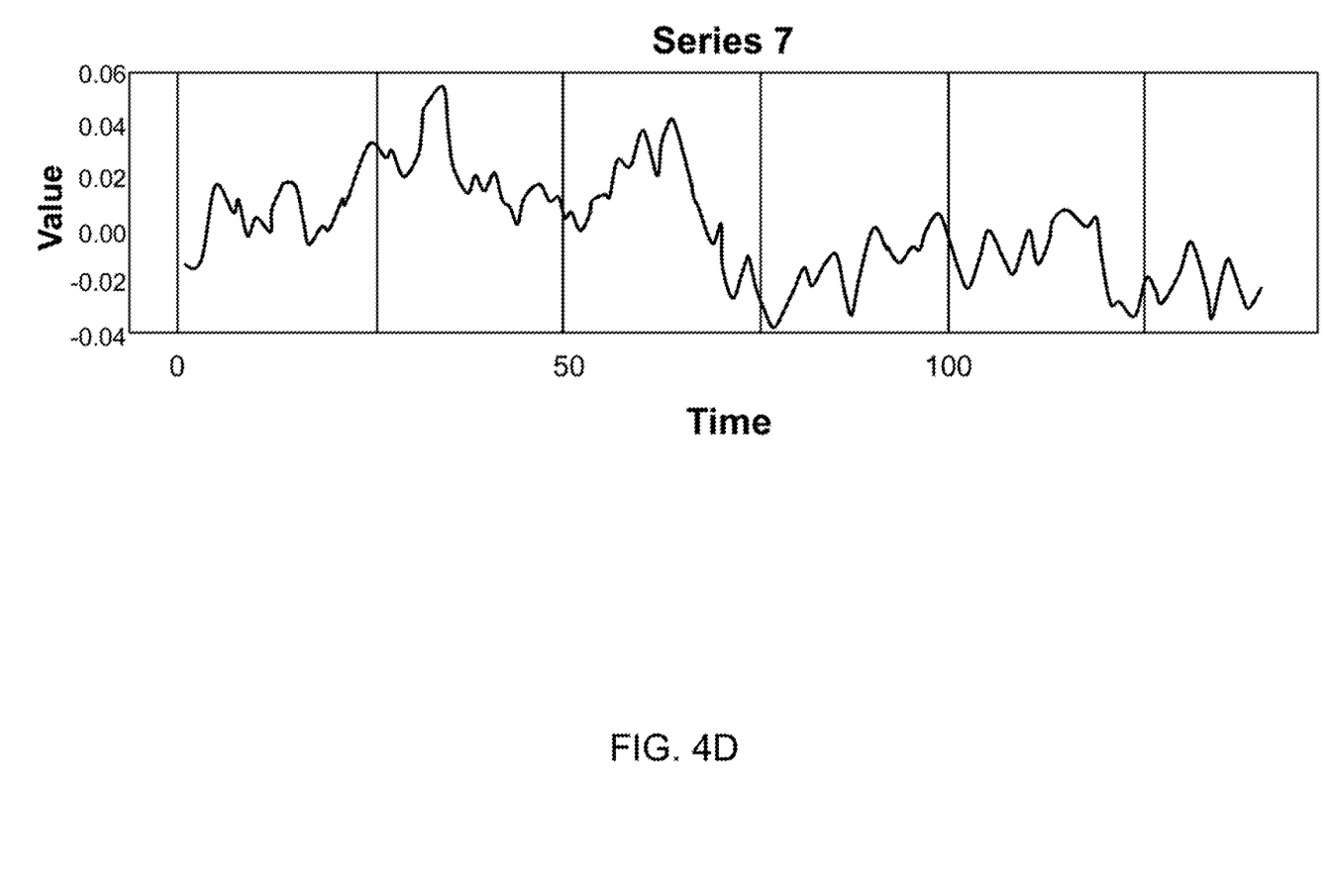
FIG. 4D is an illustration of a selected donor series according to some embodiments of the present disclosure.

FIG. 4C illustrates a non-limiting example of the visualization app (element 316). The slider (element 404) on the top of the visualization app allows the user to manually select values of the regularization L2 parameter, automatically rerunning the optimization on each step. The L2 parameter is the λ part of the term $\lambda\beta^T\beta$ in the optimization problem described above. The L2 penalty is well known in the art. The widget (element 406) in the middle allows the user to set the random seed to have consistent results with the genetic algorithm optimizer. A random seed sets a program to a specific state so that algorithms that rely on pseudorandom number generators will always generate the same result on subsequent runs. Basically, this allows programs that depend on "randomness" to produce consistent results after being rerun. The slider (element 408) in the bottom of the visualization app allows the user to select different donor series to view, such as series 7 displayed in FIG. 4C.

(3.4) Experimental Studies

The method described herein was applied in a practical study to discern the causal impact of the large-scale Brazilian protests beginning in March, 2015 on Brazilian imports, tracked in United States Dollars. These protests were conducted as a response to alleged corruption from the administration of Brazilian President Dilma Rousseff; numerous politicians have been implicated in accepting bribes from the Brazilian state-owned utility companies Petrobras and Eletrobras. A general contraction of the Brazilian economy has been observed around the time period of the protests. BRICS (Brazil, Russia, India, China and South Africa) is a recently formed association of five powerful emerging economies. These countries are significantly involved in economic cooperation as well as initiatives that promote their mutual interest. Additionally, they all have experienced a period of economic slowdown with the last decade.

Leveraging the data collection module 300 according to embodiments of this disclosure, import records as well as general economic and development indicators of the BRICS countries with the exclusion of Russia were obtained to construct a synthetic control (via the synthetic control module 302) for Brazil during the period of the protests. Russia was excluded from the analysis due to the concurrent structural shock of sanctions pertaining to the invasion of Crimea. In the analysis, Russia was replaced with Argentina, with the additional benefit that tracking data for Argentina will capture information on import behavior in Latin America. Argentina, India, China, and South Africa were, thus, chosen as donors to construct the synthetic control. The selective synthetic control method described herein is then used to generate a synthetic control to mimic Brazil and examine the corresponding counterfactual series.

Figure 5:
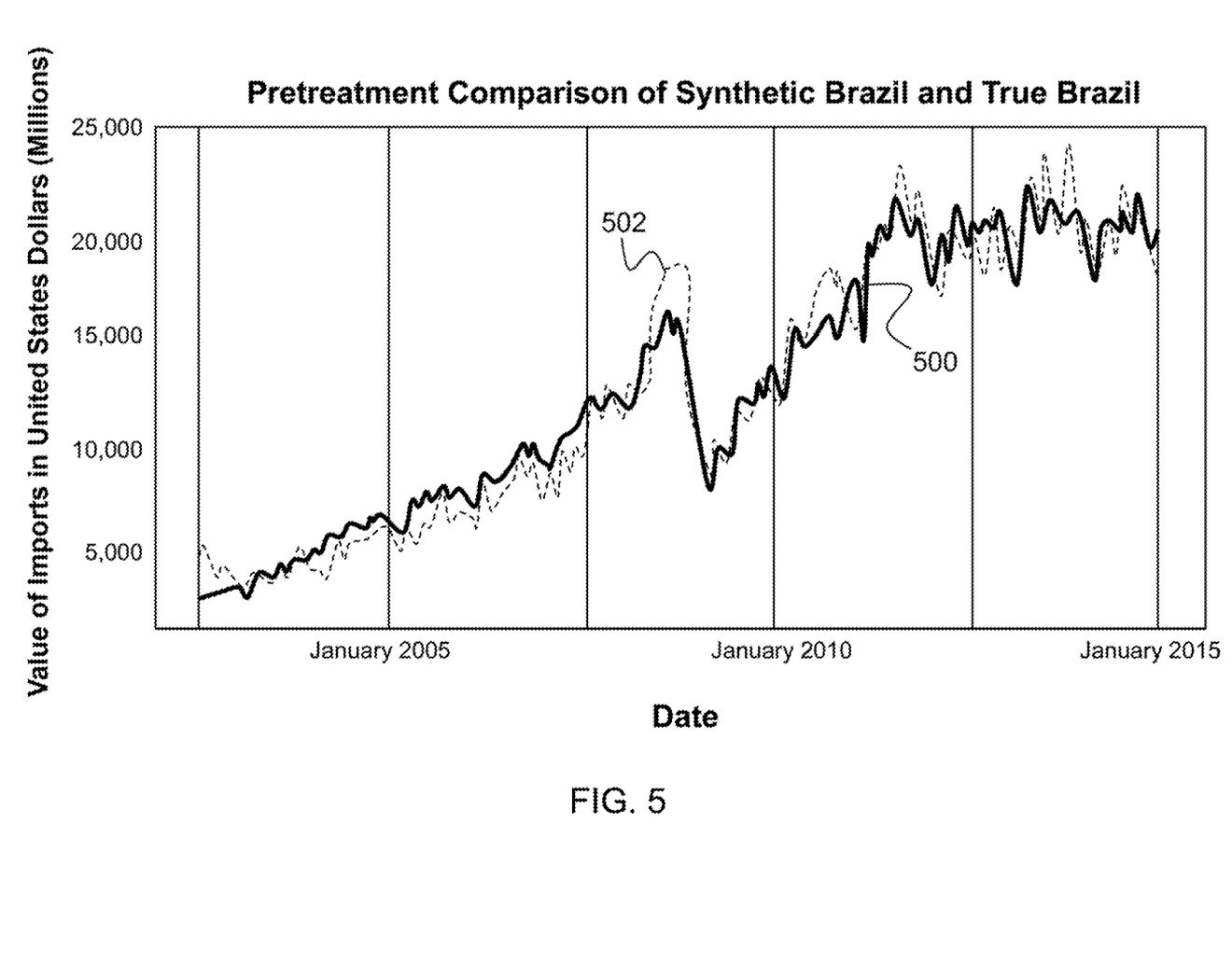
FIG. 5 is a plot illustrating a comparison of import values for synthetic control against Brazil during a pre-intervention period according to some embodiments of the present disclosure.
Figure 6:
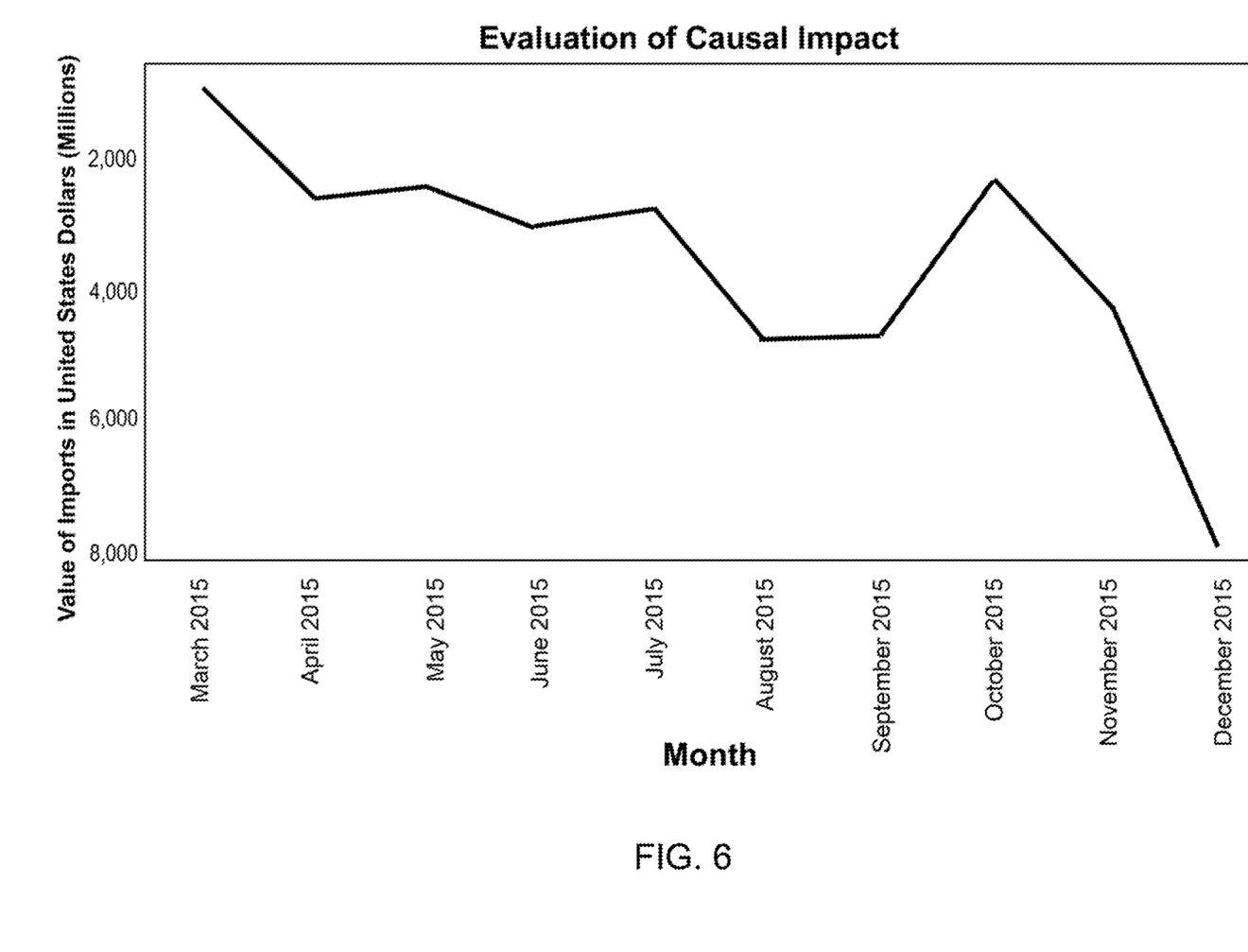
FIG. 6 is a plot illustrating causal estimates based on the selective synthetic control method according to some embodiments of the present disclosure.

FIG. 5 illustrates how well the synthetic Brazil (represented by the solid curve 500) tracks the real Brazil (represented by the dashed curve 502) pre-treatment. FIG. 6 shows a visual representation of the casual estimates generated by the synthetic control. These estimates are given in terms of the impact during each post-intervention month, and may be easily extended to future periods as soon as more timely data becomes available.

The system described herein allows end-users to monitor the impact of major events, such as protests and disasters (e.g., earthquakes, hurricanes), by collecting data from multiple public and/or private sources. End-users can then incorporate this information into their decision-making processes. For example, one could determine the effects of natural disasters on product sales or political scandals on political participation. For instance, if sales of the consumer product are quantified as decreasing due to an event, then the system can push targeted advertisements related to the consumer product to one or more social media accounts of users.

Figure 7:
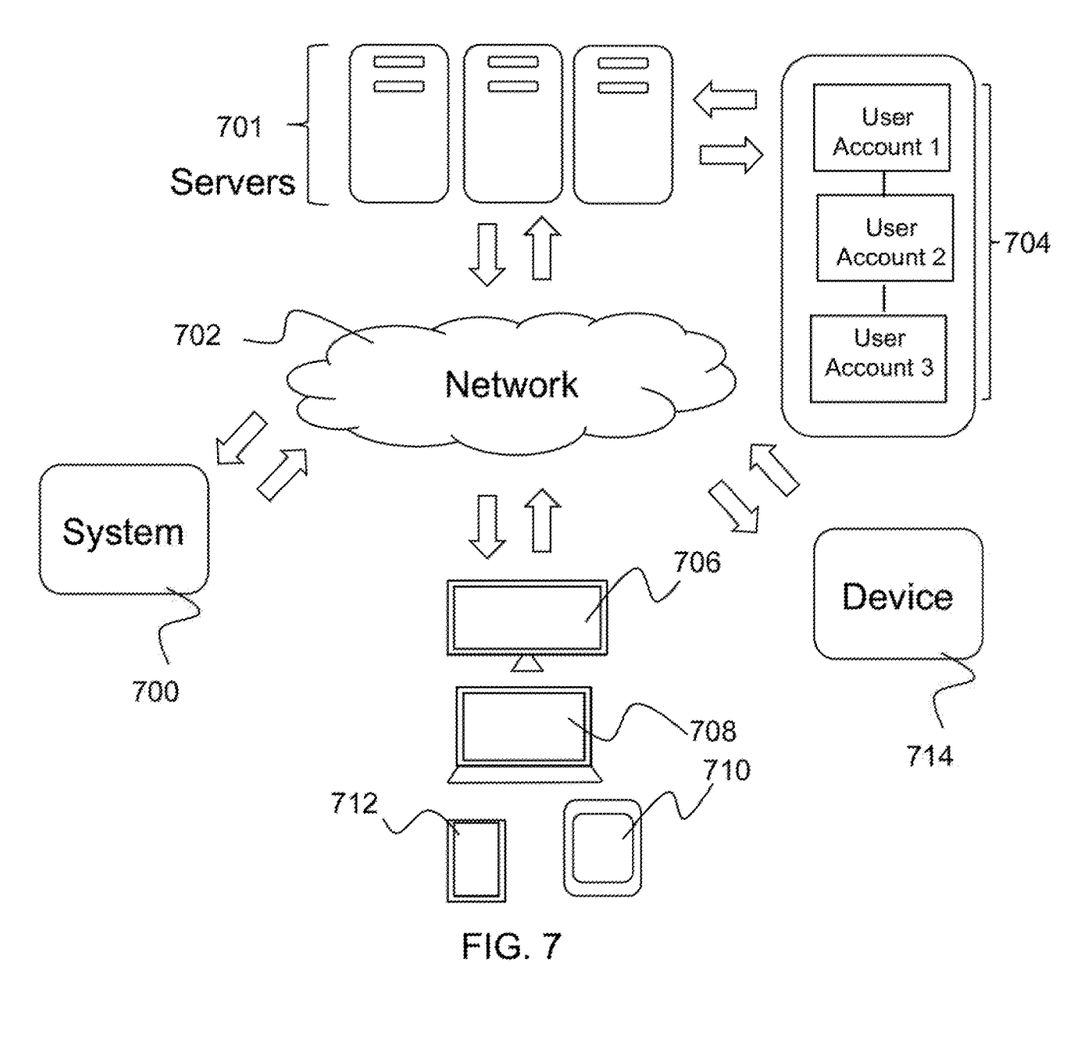
FIG. 7 is an illustration of hardware communications in the system for causal impact estimation according to some embodiments of the present disclosure.

As shown in FIG. 7, the system 700 according to embodiments of the present disclosure can connect with servers 701 for social network platforms to access information or automatically provide targeted advertisements to a display screen on a communication device (elements 706, 708, 710, 712) via a social network account or website (element 704). The system 700 can connect via a network 702 to servers 701 to send and receive information relating to various social media networks of interconnected user accounts (element 704) that are accessed via mobile and non-mobile devices, non-limiting examples of which include desktops 706, laptops 708, iPhones 710, and Android mobile devices 712. Non-limiting examples of user accounts (element 704) include Facebook® user accounts and Twitter® user accounts. As can be appreciated by one skilled in the art, the user device is any device that can receive and transmit data via the network 702. Additionally, a user account may be a user account of a social media platform, which may or may not be capable of receiving targeted marketing. The system 700 may also be used to control a device 714.

Additionally, a vehicle manufacturer might be able to discern the impact of a major event on vehicle imports/sales in a regional market. Further, the system can allow one to quantify the extent of the impact of the event, and the corresponding assessment would aid in the evaluation of the policies in that market. For instance, one can quantify the impact in terms of revenue lost, or the difference in the number of products (e.g., vehicles) sold. It depends on what variable is used for the synthetic control. One can determine an estimate by differencing the synthetic control's values from the observed values after the event occurs. The visualization application can render a graph for display to a user to compare vehicles sold during a normal year to vehicles sold during a recession to predict the impact of future recessions.

Based on the quantified extent of the impact (i.e., determined estimates), an automated manufacturing or inventory control process may be accelerated or decelerated. For example, a device 714 that is part of an assembly line may be operated slower or faster, or for a shorter or longer period of time. This, in turn, would change the number of units of a manufactured good that is created and/or may change the number of units of a product that are ordered for a particular location. Further, a stock market order (instruction to buy or sell stocks) can be executed on servers 701 in response to the impact of a major event.

Moreover, a device 714 can be controlled based on the determined estimates to send a message to a user account associated with a particular geographic location (e.g., text message, email). For example, user accounts can be associated with a particular location (e.g., based on GPS information and/or user profile information). Messages can be sent to users associated with the geographical region where an event occurred. The messages are not limited to advertisements. For instance, the message may be related to events, such as protests, traffic events, weather events, disaster/emergency events, or any other public event for which it would be useful for a user to be notified.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for estimating causal impact, the system comprising:
one or more processors and a non-transitory computer-readable medium having executable instructions encoded thereon such that when executed, the one or more processors perform operations of:
generating a synthetic control from a plurality of donor series selected to contribute to the synthetic control;
tuning a regularization parameter that controls a number of the plurality of donor series selected to contribute to the synthetic control, wherein the regularization parameter comprises a L2 penalty term;
generating post-intervention synthetic control values from the synthetic control;
determining estimates of causal effects of an intervention onto aggregate units similar to the plurality of donor series; and
controlling a device based on the determined estimates.

2. The system as set forth in claim 1, wherein the one or more processors further perform an operation of generating a visualization application in which a set of results generated based on the synthetic control can be viewed.

3. The system as set forth in claim 1, wherein the one or more processors further perform an operation of sending a message to a user account associated with a particular geographic location.

4. The system as set forth in claim 1, wherein the one or more processors further perform an operation of changing an automated manufacturing or inventory control process based on the determined estimates.

5. The system as set forth in claim 1, wherein the one or more processors further perform an operation of executing a stock market order based on the determined estimates.

6. The system as set forth in claim 1, wherein the estimates are determined based on a difference between the post-intervention synthetic control values and a set of observed values for a post-intervention treated series.

7. The system as set forth in claim 1, wherein a visualization application interfaces with the synthetic control such that results generated by the synthetic control can be updated via the visualization application in real-time.

8. The system as set forth in claim 1, wherein the plurality of donor series is obtained at regular intervals from both public and private sources.

9. The system as set forth in claim 1, wherein the aggregate units comprise at least one of regional populations, target markets, and state level entities.

10. The system as set forth in claim 1, wherein the set of results are employed to quantify an extent of an impact of an event on sales of a commercial product.

11. The system as set forth in claim 10, wherein if sales of the commercial product are quantified as decreasing due to the event, then pushing advertisements related to the consumer product to one or more social media accounts of users.

12. A computer implemented method for estimating causal impact, the method comprising an act of:
   causing one or more processors to execute instructions encoded on a non-transitory computer-readable medium, such that upon execution, the one or more processors perform operations of:
   generating a synthetic control from a plurality of donor series selected to contribute to the synthetic control;
   tuning a regularization parameter that controls a number of the plurality of donor series selected to contribute to the synthetic control, wherein the regularization parameter comprises a L2 penalty term;
   generating post-intervention synthetic control values from the synthetic control;
   determining estimates of causal effects of an intervention onto aggregate units similar to the plurality of donor series; and
   controlling a device based on the determined estimates.

13. The method as set forth in claim 12, wherein the one or more processors further perform an operation of generating a visualization application in which a set of results generated based on the synthetic control can be viewed.

14. The method as set forth in claim 12, wherein the estimates are determined based on a difference between the post-intervention synthetic control values and a set of observed values for a post-intervention treated series.

15. The method as set forth in claim 12, wherein a visualization application interfaces with the synthetic control such that results generated by the synthetic control can be updated via the visualization application in real-time.

16. The method as set forth in claim 12, wherein the plurality of donor series is obtained at regular intervals from both public and private sources.

17. A computer program product for estimating causal impact, the computer program product comprising:
   computer-readable instructions stored on a non-transitory computer-readable medium that are executable by a computer having one or more processors for causing the processor to perform operations of:
   generating a synthetic control from a plurality of donor series selected to contribute to the synthetic control;
   tuning a regularization parameter that controls a number of the plurality of donor series selected to contribute to the synthetic control, wherein the regularization parameter comprises a L2 penalty term;
   generating post-intervention synthetic control values from the synthetic control;
   determining estimates of causal effects of an intervention onto aggregate units similar to the plurality of donor series; and
   controlling a device based on the determined estimates.

18. The computer program product as set forth in claim 17, further comprising instructions for causing the one or more processors to further perform an operation of generating a visualization application in which a set of results generated based on the synthetic control can be viewed.

19. The computer program product as set forth in claim 17, wherein the estimates are determined based on a difference between the post-intervention synthetic control values and a set of observed values for a post-intervention treated series.

20. The computer program product as set forth in claim 17, wherein a visualization application interfaces with the synthetic control such that results generated by the synthetic control can be updated via the visualization application in real-time.

21. The computer program product as set forth in claim 17, wherein the plurality of donor series is obtained at regular intervals from both public and private sources.

\* \* \* \* \*